United States Patent [19]

Gongwer

[11] 4,316,478

[45] * Feb. 23, 1982

[54] FLUID CONTROL VALVE

[75] Inventor: Calvin A. Gongwer, Glendora, Calif.

[73] Assignee: Innerspace Corporation, Glendora, Calif.

[*] Notice: The portion of the term of this patent subsequent to Jun. 3, 1997, has been disclaimed.

[21] Appl. No.: 153,419

[22] Filed: May 27, 1980

Related U.S. Application Data

[62] Division of Ser. No. 943,574, Sep. 18, 1978, Pat. No. 4,205,696.

[51] Int. Cl.$^3$ .............................................. F16K 47/04
[52] U.S. Cl. .................................. 137/14; 137/625.3; 137/625.33; 251/121
[58] Field of Search .................. 137/625.3, 625.33, 14, 137/1; 251/121

[56] References Cited

U.S. PATENT DOCUMENTS

| 3,133,557 | 5/1964 | Gongwer | 137/512.1 |
| 3,920,044 | 11/1975 | Gruner | 137/625.3 |

FOREIGN PATENT DOCUMENTS 2443301  3/1976  Fed. Rep. of Germany ... 137/625.3

*Primary Examiner*—Arnold Rosenthal
*Attorney, Agent, or Firm*—Lyon & Lyon

[57] ABSTRACT

A fluid control valve and its method of use, the valve having a plurality of annular fluid control elements stacked within a housing, and resilient means for biasing the fluid control elements in a spaced apart relationship in order to provide for fluid flow between the fluid control elements, the fluid control elements forming a seat adapted to receive the resilient means and also including means for producing an interference fit about the periphery of the fluid control elements adjacent the center space within the annular stack of fluid control elements.

3 Claims, 8 Drawing Figures

FLUID CONTROL VALVE

RELATED APPLICATIONS

This application is a divisional application of U.S. Pat. Application Ser. No. 943,574 filed Sept. 18, 1978 and which issued as U.S. Pat. No. 4,205,696 on June 3, 1980.

This invention relates to an improved fluid control valve.

In valves used to throttle both gaseous and liquid flow through pipes or ducts dynamic under pressures are created thereby causing cavitation (for liquids) and noise. Abrupt changes in the path of flow of a fluid as a valve opens and closes generates frictional loses in valves and produces wear on the valve surfaces, particularly the valve seats. High velocity of fluid flow over sharp edges of a valve occurs in certain present throttling valves in portions of their opening and closing movement operation or steady operation in a partially open or throttling condition. This also causes rapid wear, cavitation for liquids and noisy operation.

The subject matter of this invention constitutes an improvement over my prior valves described in U.S. Pat. Nos. 3,133,557 and 3,316,936 and the valves of others including those described in U.S. Pat. Nos. 3,451,404 and 3,514,074.

Figure 1:
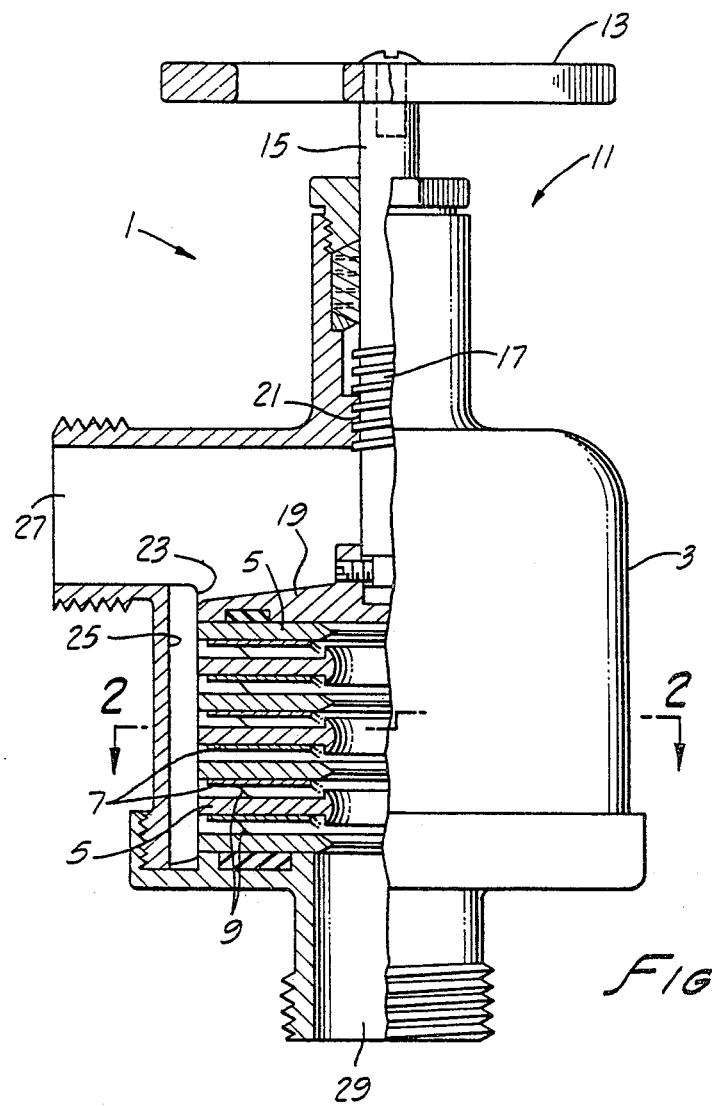
FIG. 1 is a partial cross-sectional view of a fluid control valve of the present invention.

Referring now to FIG. 1, the fluid control valve, generally referred to as 1, of this invention will be discussed. The fluid control valve 1 includes a housing 3 within which a plurality of annular fluid control elements 5 are stacked. A resilient means 7, preferably having a plurality of radially extending corrugations 9, is positioned between the fluid control elements 5 thereby biasing adjacent fluid control elements in a spaced apart relationship (see FIG. 3) thereby providing for fluid flow between the fluid control elements 5.

An axial force exerting means, generally referred to as 11, typically includes a wheel member 13, a stem member 15, having external threads 17, and a base member 19 adapted to engage said stack of fluid control elements 5, and resilient means 7 positioned therebetween. The housing 3 is preferably adapted within internal threads 21 in order to provide the mechanism for exerting an axial force against the stacked fluid control elements 5.

A retainer means 23 provides for spacing the stacked fluid control elements 5 from the interior surface 25 of the housing 1.

A conduit means 27 is provided for flow communication between the stacked flow control elements 5 and the housing 3. Conduit means 29 provides flow communication with the center space 31 within the stack of annular fluid control elements 5. Means such as base member 19 prevent fluid flow communication directly between the housing 3 and the center space 1 within the annular fluid control elements 5.

Figure 3:
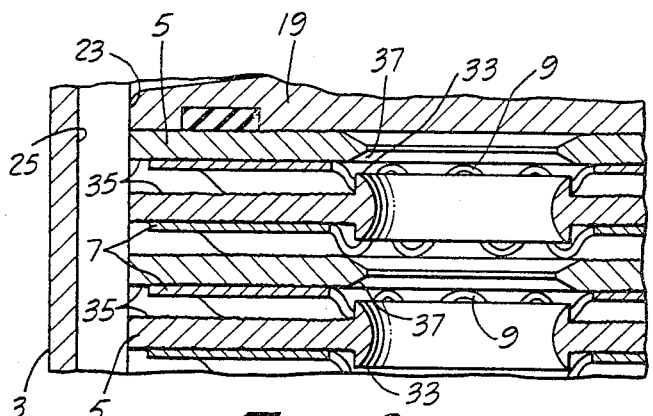
FIGS. 3 and 4 are partial cross-sectional views illustrating the fluid control valve of this invention in the open and closed positions, respectively.
Figure 4:
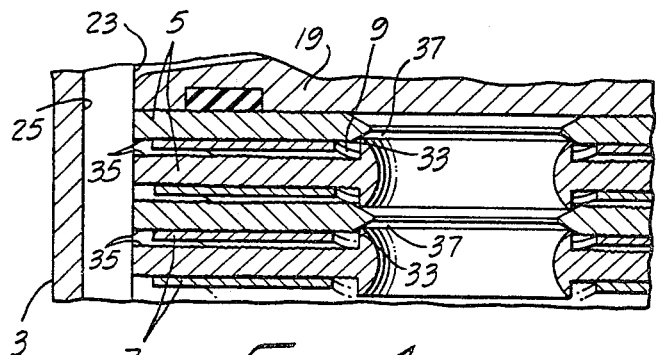

Referring now to FIGS. 3 and 4, seats 33 are provided by said fluid control elements 5 adapted to receive said resilient means 7, the fluid control elements 5 further including means for producing an interference fit about the periphery of the fluid control elements 5 adjacent the center space 31 within the annular stack of fluid control elements 5. The fluid control elements may have a rough surface for providing further resistance to fluid flow when the fluid control elements are forced together by said actual force exerting means 11. This rough surface may be formed by fine saw-tooth ring grooves 35 cut into the surface of the flow control elements 5. Preferably, alternate fluid control elements are provided with a tapered edge 37 adjacent the center space 31 within the stack of annular fluid control elements 5 for aligning the fluid control elements 5 adjacent such tapered fluid control elements.

Figure 6:
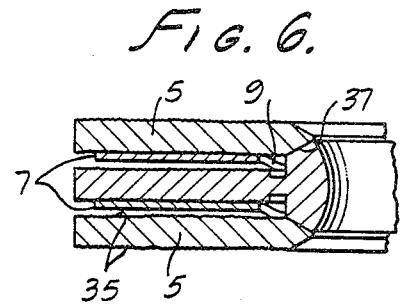
FIG. 6 is a partial cross-sectional view illustrating a fluid control element of the fluid control valve of this invention.

Fluid control elements on either side of the tapered fluid control elements may be provided with a bulbous end portion which adjusts and aligns such fluid control elements along the tapered fluid control elements. FIG. 6 illustrates an alternative configuration wherein alternative fluid control elements 5 are flared rather than tapered adjacent the center space 31 within the annular stack of fluid control elements 5.

Figure 7:
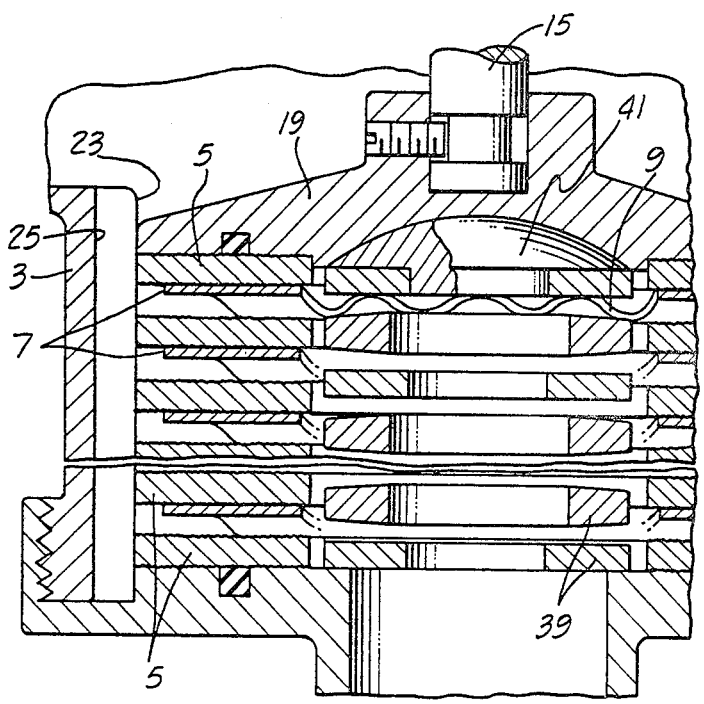
FIG. 7 is a partial cross-sectional view illustrating a fluid control valve of the present invention.
Figure 8:
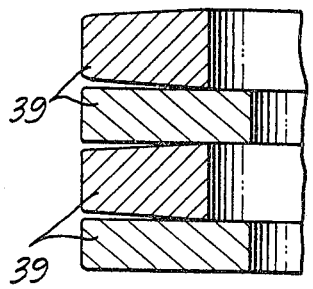
FIG. 8 is a partial cross-sectional view illustrating a portion of the fluid control valve of this invention.

Referring now to FIG. 7, a further preferred embodiment is shown wherein a second stack of annular fluid control elements 39 are provided. As shown in FIG. 8, alternate second fluid control elements 39 are preferably provided with a taper of greatern than 0° and less than 3° adjacent the center space within the first annular fluid control elements 5 and resilient members 7.

Further, a truncated spherical element 41 is adapted to pivot within the base member 19 of the axial force exerting means 11 in order to provide for alignment of the first and second stacks of fluid control elements 5 and 39.

Having described a preferred embodiment of this invention, its method of operation will now be discussed.

Figure 5:
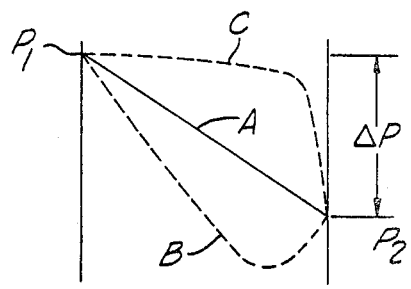
FIG. 5 is a pressure profile diagram illustrating the change in pressure as fluid flows through a fluid control valve of this invention.
Figure 2:
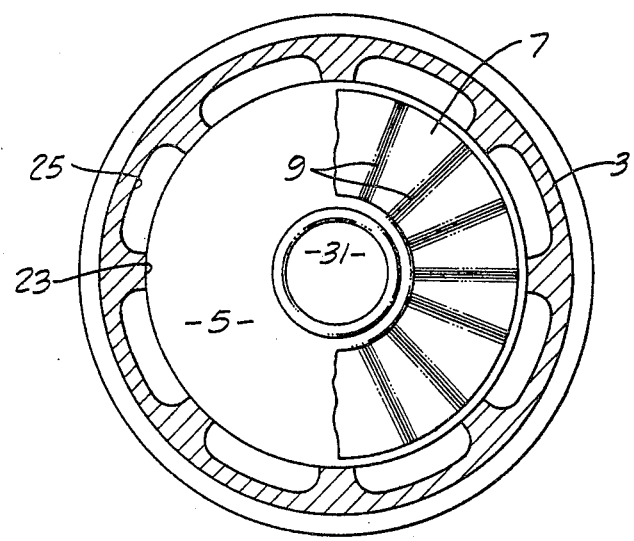
FIG. 2 is a view taken about line 2—2 of FIG. 1.

Referring to FIG. 5, the pressure coming into the fluid control valve $P_1$ and the pressure leaving the control valve $P_2$ are shown. Curve A represents a smooth and gradual linear pressure drop while throttling flid from pressure $P_1$ to pressure $P_2$. FIG. B illustrates the dynamic underpressure produced in typical throttling valves which causes cavitation, damage and noise and which are further aggravated if the fluid is a liquid and the vapor pressure of the fluid is reached.

Curve "C" illustrates the pressure profile produced by a valve of the present invention as it is closed. Such a curve has a stabilizing and equalizing effect on the clearances between the fluid control elements 5, and 39 in the embodiment of FIG. 7. In that, importantly, if the fluid control elements 5 (and 39 in the embodiment of FIGS. 7 and 8) close at one of the portions of the valve prematurely, the pressure with the prematurely closed portions will approach $P_1$ (Curve C in FIG. 5) and due to the lower pressures at adjacent elements on either side the prematurely closed portion will tend to open. This insures that all of the flow control elements 5 (and 39) will open and close uniformly and smoothly.

Referring now to FIG. 1, it may be seen that incoming fluid will pass into conduit means 27 and the space between the retainer means 25 and the stack of fluid control elements 5, between the fluid control elements 5 and outwardly through the conduit means 29.

When the fluid flow is gaseous rather than liquid, the flow would enter conduits 29 and exit conduit 27, the interference fit being provided at the outer periphery of the fluid control elements 5, thereby allowing for expansion of the gas as the pressure decreases. While cavitation is not present for gases, ordinarily occurring supersonic gaseous flow may cause noise and vibration absent the configuration of the valve of this invention.

Preferred embodiments of this invention having been specifically described and shown by way of illustration, but not as limitive of the inventions since modifications therein may be made by those skilled in the art and the arrangements of the parts of the valve and in the manner of its utilization without departing from the scope of the invention as defined by the appended claims:

What is claimed is:

1. A fluid control valve comprising:
    a housing;
    a plurality of first annular fluid control elements stacked within said housing;
    a plurality of second annular fluid control elements stacked within the center space within said first annular fluid control elements, alternate second fluid control elements being provided with a taper of greater than 0° and less than about 3° adjacent the center space within said first annular fluid control elements;
    retainer means for spacing said first stacked fluid control elements from the interior surface of said housing;
    axial force exerting means for causing said first control elements to move toward each other thereby restricting the fluid flow between said first fluid control elements, and ultimately causing said first fluid control elements to come into contact thus preventing fluid flow between said first fluid control elements;
    conduit means in flow communication between said stacked first and second flow control elements and said housing;
    conduit means in flow communication with the center space within said second annular fluid control elements;
    means for preventing fluid flow communication directly between said housing and said center space within both said first and second annular fluid control elements; and
    said first fluid control elements being further defined as forming seats adapted to receive a resilient means and said second fluid control elements further including means for producing an interference fit about the periphery of said second fluid control elements adjacent said center space within said first annular fluid control elements.

2. The fluid control valve claimed in claim 1 wherein said axial force exerting means further includes a rotatable truncated spherically shaped member whose seat adapted to receive the resilient means.

3. The method of controlling the flow of fluid through a valve comprising:
    maintaining a plurality of first stacked annular fluid control elements in a orientation spaced away from the interior surface of a valve housing;
    maintaining a plurality of second stacked annular fluid control elements within the center space within said first stacked of annular fluid control elements, alternate second fluid control elements being provided with a taper of greater than 0° and less than about 3° adjacent the outer space within said first annular fluid control elements;
    exerting axial force for causing said first fluid control elements to move toward each other thereby restricting the fluid flow between said first fluid control elements and ultimately causing said first fluid control elements to contact thus preventing fluid flow between said first fluid control elements;
    and seating a resilient means within a seat provided in said first fluid control elements and producing an interference fit about the periphery of said second fluid control elements adjacent the center space within said first annular fluid control elements.

* * * * *